(No Model.)
C. THOMPSON.
CAR TRUCK.
No. 514,873.  Patented Feb. 13, 1894.
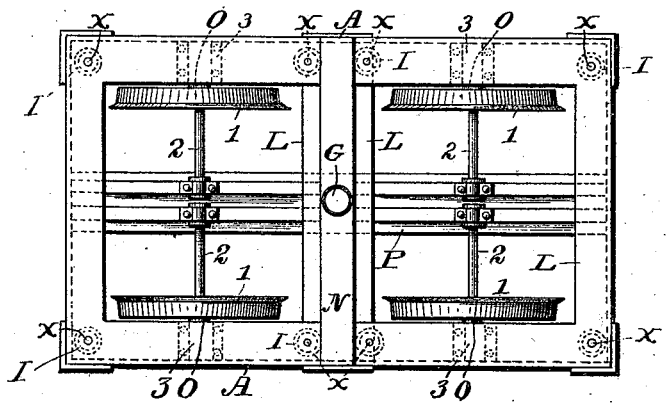
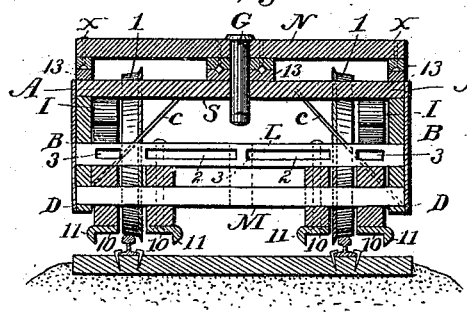
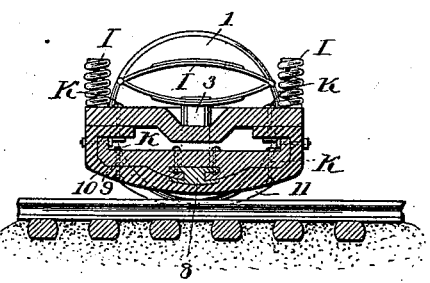
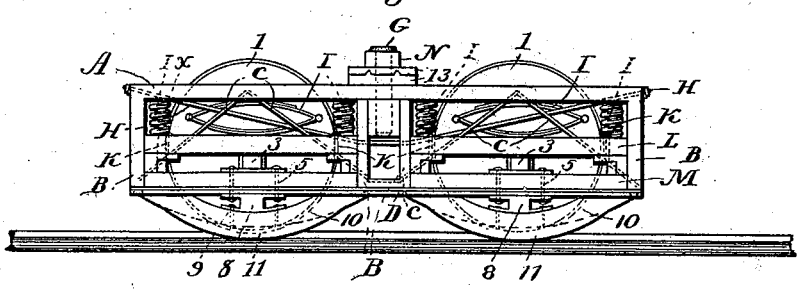
Witnesses:
Inventor.
Charles Thompson

UNITED STATES PATENT OFFICE.

CHARLES THOMPSON, OF OSWEGO FALLS, ASSIGNOR OF ONE-HALF TO J. H. CASE, OF FULTON, NEW YORK.

CAR-TRUCK.

SPECIFICATION forming part of Letters Patent No. 514,873, dated February 13, 1894.

Application filed May 12, 1893. Serial No. 474,045. (No model.)

*To all whom it may concern:*

Be it known that I, CHARLES THOMPSON, a citizen of the United States, and a resident of the village of Oswego Falls, in the county of Oswego and State of New York, have invented a new and Improved Safety Car-Truck, of which the following is a specification, reference being had to the annexed drawings, in which like letters and numbers of reference indicate like parts.

My object is to provide a safety car truck with suitable attachments rigidly connected and supported in direct connection with the journal boxes and thereby allowing an independent spring action on each separate section of the wheels when passing over an uneven track.

My invention relates to a safety car truck for rail-road cars provided with sectional safety brakes that are rigidly supported by the sectional frames, and also by the pedestal brace, all of which is connected with the journal boxes on the axles and rigidly braced thereby to resist a sudden shock on the convex brakes when coming in contact with the rails as would occur in case of a derailment of the wheels, thus converting the convex brake and the truck into a sled and creating the desired friction on the rails to check the train.

The object of the convex brake is to regulate the friction to a standard of safety, in case that the brake is substituted to support the car in place of the wheels as heretofore described. The convex brake is located the desired distance from the rail, the switches and cross-tracks and other obstructions that are on the line parallel with the top of the rail. The brake is also provided with flanges on either side to prevent its leaving the rail when operating as a sled. In case of substituting this safety truck in connection with cars for elevated roads, the brake would be located on a parallel line with the top of the rail, and the flanges could be changed lower in case it was desirable to dispense with the guard timbers now in use to prevent the derailment of the train, thereby locating the convex brake and the lower face of the wheel on a parallel line; in case of a derailment of the wheels they are thus supported and prevented from coming in contact with the ties that support the track.

Each truck is provided with a suitable connection at each corner, which is united to the car by a chain to prevent the rotation of the truck when operated as a sled upon the rails, and retaining its position on a parallel line with the car and the rails. The sectional frames are rigidly connected to the journal boxes and no lateral motion of the axles is allowed in the journal boxes; and as a substitute for said lateral motion required in car axles, the sectional frame, the journal boxes and the axles are rigidly connected and the entire section is allowed three fourths of an inch lateral motion in connection with the main car truck frame.

Figure 1 is a top plan view of the truck frame. Fig. 2 is a transverse sectional elevation. Fig. 3 is an end elevation of one of the sectional frames. Fig. 4 is a side elevation of the truck complete.

It is constructed as follows: "A" is the main frame; "B" the corner braces rigidly secured to the frame "A," and also braced by brackets "c. c." and lateral brace "D" to secure the trucks in position. The brace "B" is further secured and braced by the truss-rods. The king bolt "G" secures the bolster "N" in position with the bed block "S." "N" the bolster and rub irons "13." Each section of wheels is independent and separate from the other section. Sectional frames "L" and "M" are united and rigidly secured by the bolts "K" that also connect with the brake "10." The pedestal brace support "8" is also connected to the convex brake "10" by bolts "9" "9" affording a rigid support beneath the journal bearing, and is also connected substantially to the frame "M" and journal box "3" by bolts "5" and "5." The brake "10" operates in union with the axle in the upward and downward movement of the springs "I" when passing over obstructions or an uneven track.

The main truck frame "A" is supported on springs "I" that are secured in a rigid position by bolts on a sectional frame "L" and providing the required elasticity in the support of the car, and allowing either wheel "1" a free action in union with an upward movement of the springs.

The safety brake "10" is provided with flanges 11 and 11 to retain the convex brake on the rails.

The journal boxes "3" are provided with an oil reservoir and inner rings 2 on the axle bearing that rest in close proximity to the journal box on the inner side of the frame, and thereby inclosing the journal box in a manner to prevent the escape of the lubricating oil from the journal box.

The lateral motion usually allowed in car axles could not be permitted in connection with this improvement; therefore, the frames are allowed a lateral motion in union with the journal boxes, and the axles and wheels in connection with the main car truck frame.

I claim—

1. The combination with the main frame A of the sectional frames and springs located between the said main frame and sectional frames, the latter frames carrying the convex brakes, substantially as described.

2. The combination with the sectional frames, supporting springs upon which rests the main frame, of the brakes rigidly attached to the said sectional frames, as set forth.

3. In a car truck the combination of the main frame, sectional frames, brake shoes, and divided axles carrying wheels, all as set forth.

4. A car truck consisting of a main frame, sectional frames, springs, axles carrying wheels, and brake shoes located on each side of the wheels, substantially as described.

CHARLES THOMPSON.

Witnesses:
   CHAS. H. DEXTER,
   ELLEN POLLARD.